United States Patent
Egloff

(10) Patent No.: US 6,168,180 B1
(45) Date of Patent: Jan. 2, 2001

(54) BICYCLE STAND

(76) Inventor: Gary Egloff, 5511 Bonneville Rd., Hidden Hills, CA (US) 91302

(*) Notice: Under 35 U.S.C. 154(b), the term of this patent shall be extended for 0 days.

(21) Appl. No.: 09/020,720

(22) Filed: Feb. 9, 1998

(51) Int. Cl.[7] .................................................. B62H 1/00
(52) U.S. Cl. ........................ 280/293; 295/297; 295/304; 295/298; 295/301
(58) Field of Search .................................. 280/293, 295, 280/297, 304, 298, 301

(56) References Cited

U.S. PATENT DOCUMENTS

| 1,227,390 | * | 5/1917 | Cook | 280/293 |
|---|---|---|---|---|
| 2,396,890 | * | 3/1946 | Schwinn | 280/301 |
| 2,455,312 | * | 11/1948 | Mueller | 280/301 |
| 2,657,941 | * | 11/1953 | Adzima | 280/301 |
| 3,376,049 | * | 4/1968 | Gordon | 280/301 |
| 3,910,603 |  | 10/1975 | Shipman . | |
| 4,556,230 |  | 12/1985 | Diekman . | |
| 4,856,803 | * | 8/1989 | Carter | 280/293 |
| 4,971,346 |  | 11/1990 | Fales, III et al. . | |
| 5,293,786 |  | 3/1994 | Hsu . | |
| 5,346,238 |  | 9/1994 | Greenfield . | |
| 5,498,013 | * | 3/1996 | Hwang | 280/283 |

FOREIGN PATENT DOCUMENTS 3505692    8/1986  (DE) .

* cited by examiner

Primary Examiner—Lanna Mai
Assistant Examiner—Toan To
(74) Attorney, Agent, or Firm—Knobbe, Martens, Olson & Bear LLP

(57) ABSTRACT

A removable stand comprising a mounting block and support post supports a bicycle at an angle. The support post is nonrotatably friction fit within a socket formed in the mounting block. The mounting block is mounted upon a single frame element, such as a chainstay or swing arm tube. The support post is readily installed and removed, and can be stored on a second location on the bicycle when the bicycle is in use.

13 Claims, 5 Drawing Sheets

BICYCLE STAND

BACKGROUND OF THE INVENTION

1. Field of the Invention

The present invention relates in general to a stand for a two-wheeled vehicle, and in particular to a removable stand for use with a bicycle.

2. Description of Related Art

Stands to support bicycles in an upright position relative to the ground are as old as the bicycle itself. One form of such a stand is the common kickstand which is typically permanently fastened to the bicycle frame. The kickstand is adapted to swing down into an earth-contacting position and is held in such a position by a spring-loaded detent. The bicycle then leans on the kickstand. Raising the bicycle to a vertical position permits the kickstand to be rotated to a horizontal storage position. The kickstand is raised by directly kicking the stand or peddling the bicycle forward. Generally, the kickstand can be reversibly held in the storage position by a further detent.

Conventional kickstands have entailed several shortcomings. For example, they can easily release and rotate upward into the closed position with forward motion of the bicycle. The advent of off-road bicycle use has also highlighted further shortcomings of the conventional kickstand.

Mountain bicycles are a new twist on the traditional bicycle. The mountain bicycle is specifically designed for use on rougher terrain. Riding on such rougher terrain, however, jolts and jostles the bicycle. Because conventional kickstands tend to be held in a stored position by detent or spring biasing mechanisms, the conventional kickstand can inadvertently deploy while riding on rough terrain and catch on the ground while the bike is in motion. When accidentally deployed, the traditional kickstand poses a risk of injury to the rider of the bicycle and those riding closely behind. Accordingly, many mountain bicycle riders either remove the traditional kickstand or purchase mountain bicycles which have been manufactured without a kickstand.

Recent advances in mountain bicycle design have increased the popularity of bicycles with suspension systems. Bicycles are now available with front suspension, rear suspension and full suspension systems. The rear suspension and full suspension systems attempt to isolate the majority of the frame from the movements of the rear wheel. In many of these bicycles, the suspension system and rear wheel rotate about a common pivot point when passing over a bump in the terrain. The rear wheel, traditionally held in place by a pair of chain stays in a fixed relation to the rest of the frame, is mounted on a pair of pivotable swing arms. The suspension system and rear wheel thus attach to the main portion of the frame at the pivot point. Kickstands are conventionally mounted between the chain stay portions of the frame in an area between the seat tube and the rear wheel. By replacing traditional chain stays with pivoting swing arms, these suspension systems make it difficult, if not impossible, to mount traditionally designed kickstands.

Mountain bicycles designed for off-road conditions have thus created a need for a stand which is compatible with a variety of frame designs and operational realities of such bicycles. Desirably, due to the competitive nature of the mountain bicycle industry, such a stand should be inexpensive and easy to manufacture. The stand should further be quickly and easily removed and stored safely elsewhere on the bicycle.

SUMMARY OF THE INVENTION

The above-noted needs are satisfied by several aspects of the present invention. In accordance with one aspect, a stand is provided for supporting a bicycle upon a section of ground. The stand includes a bracket with an aperture and a mounting mechanism configure to mount the bracket upon a single frame element of the bicycle. The stand further comprises a support post having a first and a second end. The first end is sized and shaped to removably engage with the aperture of the bracket. The second end is adapted to engage the ground.

In accordance with another aspect of the present invention, a bicycle with rear suspension is provided with a frame, two wheels, two peddles, and a socket block. The socket block has an aperture formed in it. The bicycle also includes a support rod, which is adapted to be nonrotatably and removably placed within the aperture.

In accordance with another aspect of the present invention, a bicycle includes a frame and a stand assembly. The stand assembly, in turn, includes a mounting block fixed to the bicycle frame. The prop rod has a first portion and a second portion, and these two portions define an angle between about 90° and 120°. One of the prop rod and the mounting block include a receiving aperture, while the other of the prop rod and the mounting block include a male piece adapted to reversibly mate with the receiving aperture.

In accordance with another aspect of the present invention, a stand is provided for supporting a two-wheeled vehicle in a standing position. The stand includes a bracket for attaching to a frame of the vehicle. The bracket includes an aperture. The stand also includes a rod with a first end and a second end. The first end is proportioned to be frictionally held within the aperture when the vehicle is supported upon the stand. The second end is adapted to contact the ground when the vehicle is supported upon the stand.

In accordance with another aspect of the present invention, a method is provided for using a removable bicycle stand. The method includes holding a bicycle substantially upright and frictionally fitting a support post into an aperture. The aperture is defined at a first location on the bicycle. The bicycle is then leaned towards the support post.

BRIEF DESCRIPTION OF THE DRAWINGS

The above mentioned and other features of the invention will now be described with reference to the drawings of preferred embodiments. The illustrated embodiments are intended to illustrate, but not to limit, the invention. The drawings contain the following figures.

DETAILED DESCRIPTION OF THE PREFERRED EMBODIMENT

Figure 1:
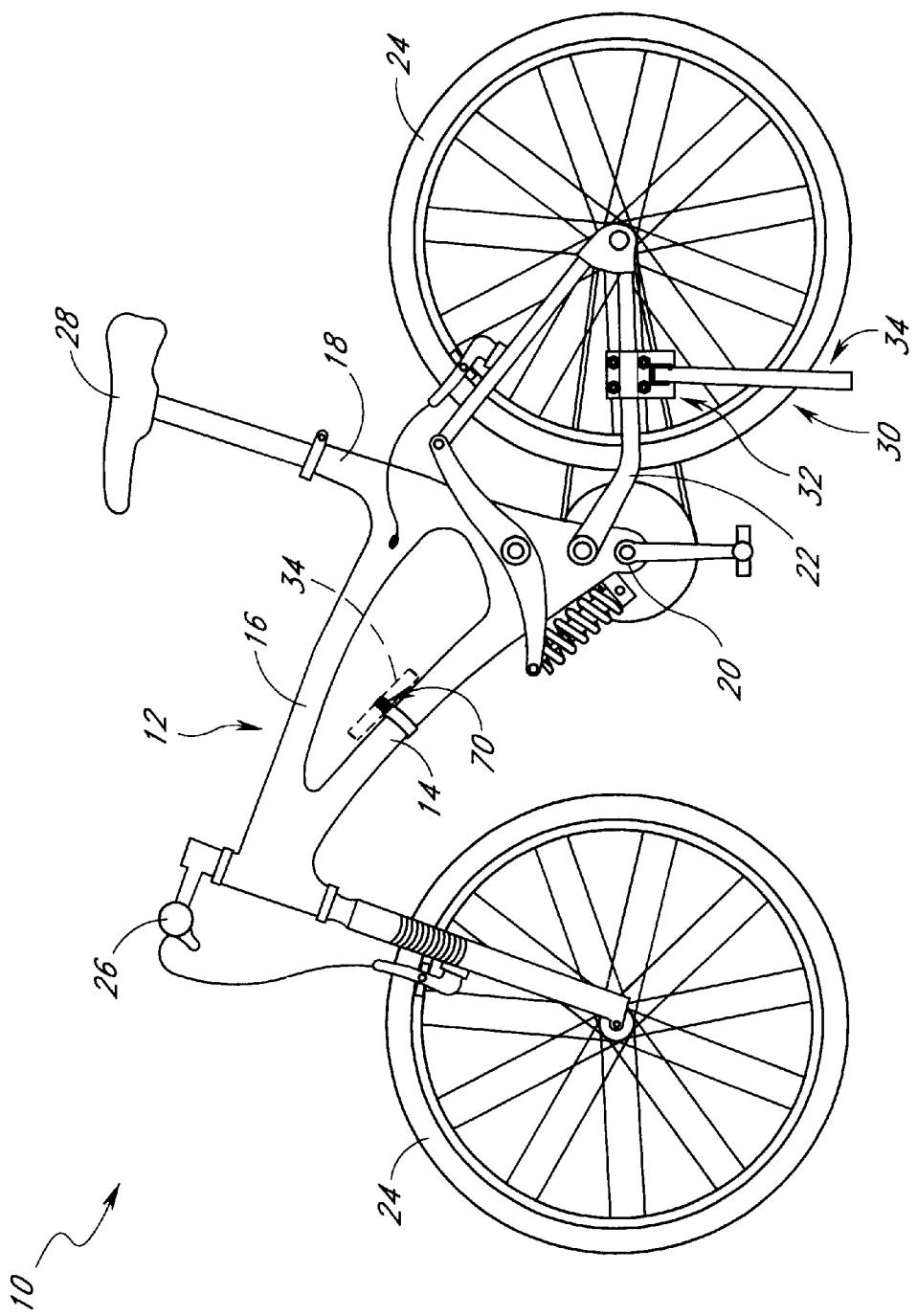
FIG. 1 is a side elevational view of a rear-suspension bicycle having a stand constructed in accordance with a preferred embodiment of the present invention.

With reference initially to FIG. 1, a mountain bicycle is illustrated which includes a stand for supporting the bicycle upon the ground, constructed in accordance with a preferred embodiment of the present invention. It will be understood that "ground," as used in the present disclosure, can refer to any surface upon which the bicycle is to be supported, including asphalt, floors, grass, rock, etc.

The mountain bicycle is identified generally by the reference numeral 10. The present stand has particular utility with mountain bicycles having rear suspension systems, such as the bicycle shown. One of skill in the art, however, will find applications for the disclosed stands in connection with other types of two-wheeled vehicles. The illustration of the stand in connection with a rear suspension mountain bicycle is thus merely exemplary.

As shown in FIG. 1, the bicycle 10 includes a frame 12 composed of a number of frame elements, particularly a downtube 14, a crosstube 16, a seat tube 18, a hub 20 and a pair of swing arms 22. The frame elements are formed of a suitable material such as, for example, steel, aluminum or any of a number of lightweight metal alloys, and they are connected together by any suitable means. While the illustrated frame elements comprise typical tubular members, having cylindrical cross-sections, it will be understood that, in other arrangements, the frame elements can take other shapes suitable to their structural purposes. The bicycle also includes various components which are attached to the frame. For instance, the wheels 24, handlebars 26 and seat 28 are attached to the frame 12.

Figure 2:
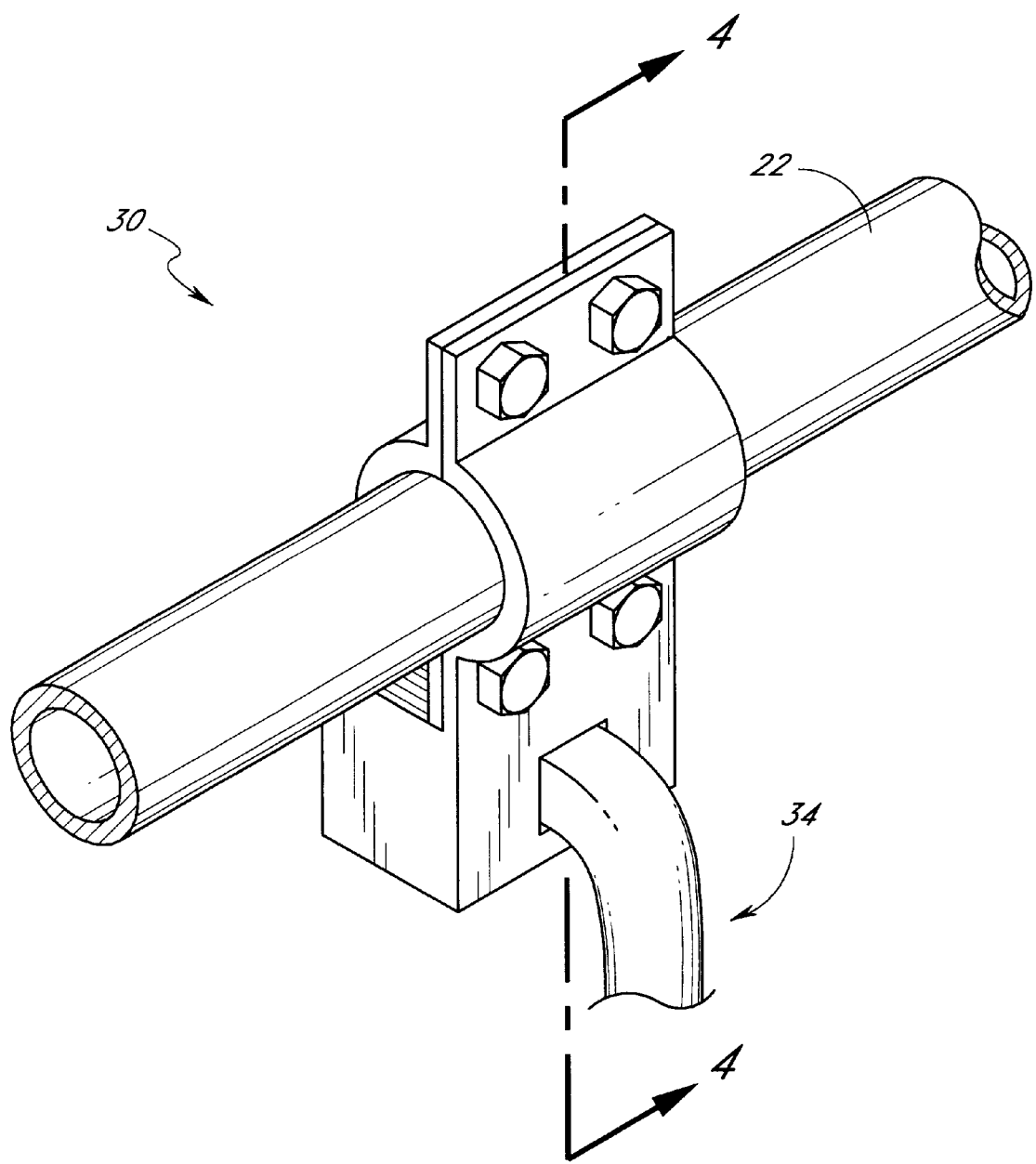
FIG. 2 is a top front perspective view of a stand assembly, constructed in accordance with a preferred embodiment, mounted upon a bicycle frame.

As shown in FIGS. 1 and 2, a stand 30 is preferably completely supported upon a single element of the frame 12. The illustrated stand 30, in particular, is mounted to a swing arm 22. The stand can alternatively be mounted to one or more of the other elements of the bicycle frame. The illustrated stand 30 comprises two basic components: a mounting bracket 32 and a removable support post 34. As shown in FIG. 2, the mounting bracket 32 is configured to receive the support post 34.

Figure 3:
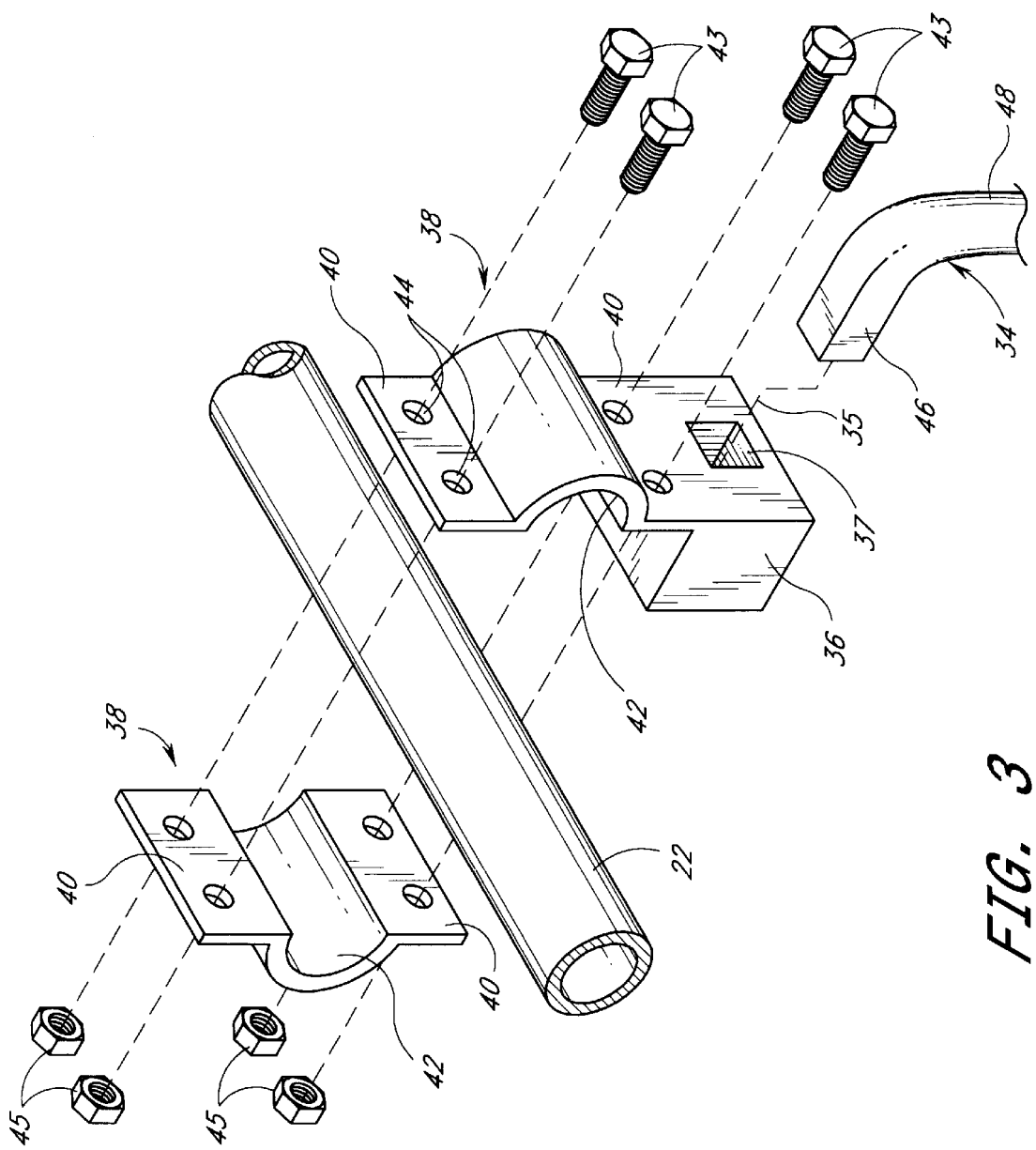
FIG. 3 is an exploded perspective view of the stand assembly of FIG. 2.

As illustrated in the exploded perspective view of FIG. 3, the mounting bracket 32 comprises a socket block 36 which depends from one half of a two part clamping shell 38. The socket block 36, as shown in FIG. 3, is preferably a block of material having an aperture 37. The illustrated socket block 36 has a height of about 2 inches to 3 inches, a width of about 2 inches to 3 inches, and a depth along the aperture axis of about ¾ inch to 1½ inch. Desirably, the socket block 36 is injection molded. Suitable materials include metals and metal alloys, but the block preferably comprises a strong yet lightweight polymeric material, most preferably nylon plastic.

The aperture 37 extends at least partly and preferably completely through the depth of the socket block 36. Thus, as used in the present disclosure, "aperture" may refer to a recess in the socket block 36, or to a through-bore. The aperture 37 is sized to receive and frictionally hold the support post 34, in a manner which is more fully described below. The aperture can be any of a number of geometrical shapes, such as, for example, an octagon, a triangle, a diamond, or a rectangle, but preferably has a cross-section which includes at least one corner, slot or other means to keep the inserted post 34 from rotating therein. The illustrated aperture 37 preferably is rectangular, and particularly square in cross-section, with a height and width preferably between about ¼ inch and 1½ inch, more preferably about ½ inch to ¾ inch. Accordingly, the aperture is defined by walls which are preferably between about ¼ inch and about 1 inch thick. More preferably, the walls are about ¾ inch thick. The aperture 37 axis is preferably substantially normal to the axis of the swing arm to which it is attached. As will be understood from the description below, the aperture 37 axis is also referred to herein as the bore axis or receiving axis and is designated by the reference numeral 35 in FIGS. 3, 4 and 5. The walls defining the bore 37 surround this axis 35, as shown.

As shown in FIG. 3, the illustrated clamping shell 38 comprises two mirror image portions. One portion is illustrated in FIGS. 1–4 as being integrally formed with the socket block; it will be understood, however, that the clamping shell 38 can be formed separate from the socket block 36 and affixed to the socket block 36 in a known manner. Each half of clamping shell 38 has two coplanar flat flange portions 40 separated by a channel 42. The channels 42 are sized and shaped to mate with the frame element 22, and in the illustrated embodiment are c-shaped to clamp onto a cylindrical tube. The clamping shell 38 is preferably between about ⅒ inch and about ⅛ inch thick. In addition, the clamping shell 38 is preferably between about 2 inches and 3 inches long where the length of the clamping shell 38 is the axial distance from end to end of the c-channel 42, thus coextensive with the preferred integral socket block 36. The clamping shell 38 is held together by fasteners 43 which attach the flange portions 40 to one another. In the embodiment illustrated in FIGS. 1–4, the fasteners 43 comprise four threaded bolts which fit through openings 44 in each of the flanges 40 and are held in place by internally threaded nuts 45.

In the preferred embodiments, the support post 34 comprises a short shank portion 46, which is adapted to fit in the aperture 37 of the socket block 36, and a longer leg portion 48 depending therefrom. The preferred support post 34 comprises integrally molded nylon plastic for superior strength-to-weight ratios. The support post 34 can alternatively be manufactured from other materials, as noted with regard to the socket block 36.

The cross-sectional dimensions of the support post can also vary, as will be understood by those skilled in the art. For example, while the cross section of the end of the support post which is received by the socket block is square in the illustrated embodiment, the lower portion of the support post is preferably round in cross-section. The cross-sectional shape of the support post, therefore, can either be uniform or vary along its length. Alternative cross-sectional shapes include any of a number of geometric shapes such as a triangle, rectangle, diamond, octagon or the like. The socket block and the support post can also be provided with a mating tongue and groove configuration, a mating key and keyway, or other similar structures known in the art which can either restrict or prevent rotation of the support post within the aperture of the socket block.

As mentioned above, the support post 34 includes a short shank portion 46 formed its upper-most portion. The length and shape of the shank 46 is chosen to prevent slippage within the aperture 37 in use. By properly sizing the shank 46 in relation to the aperture 37 size, the shank 46 can be firmly secured in the aperture 37 and held assure that the shank 46 will not accidentally disengage from the aperture 37. The length of the illustrated shank 46 is preferably determined by the depth of the socket block 36. While the shank 46 can extend through the back-side of the socket block 36, or end within the socket block 36, the illustrated shank 46 is flush with the back-side of the socket block 36 when the two pieces are assembled. Accordingly, the length of the shank portion 46 is preferably about ¾ inch to 1½ inches, to match the depth of the preferred aperture 37.

The leg portion 48 of the support post 34 depends downward from the shank portion 46 of the support post.

The length of the leg 48 of the support post 34 is determined in part by the angle of tilt desired in the supported bicycle, the design of the bicycle (particularly the distance to the ground from the preferred mounting location) and the desired angle between the shank 46 and the leg 48. By properly determining the length of the leg portion 48, it is possible to leave the support post 34 mounted on the bicycle when the bicycle is moved short distances without causing the support post 34 to catch on the ground. The preferred length of the leg 48 is generally between about 9 inches and 12 inches. Alternatively, the post can be manufactured in greater lengths with notches or other markings to aid consumers in sawing the leg portion to customize the length of the kickstand 30. At the lower end of the leg portion 48, the support post 34 can also be provided with a rubber tip as illustrated, particularly for embodiments in which the post 34 is formed of metal.

As illustrated, the shank 46 extends along a first or shank axis 47 portion and the leg portion 48 extends along a second or leg axis 49 that define an inside angle, α. The angle is dependent on many elements including the leg length and the desired tilt angle of the bicycle. The angle is preferably between about 90° and about 135°, more preferably between about 90° and 120°, and most preferably about 105°.

Figure 4:
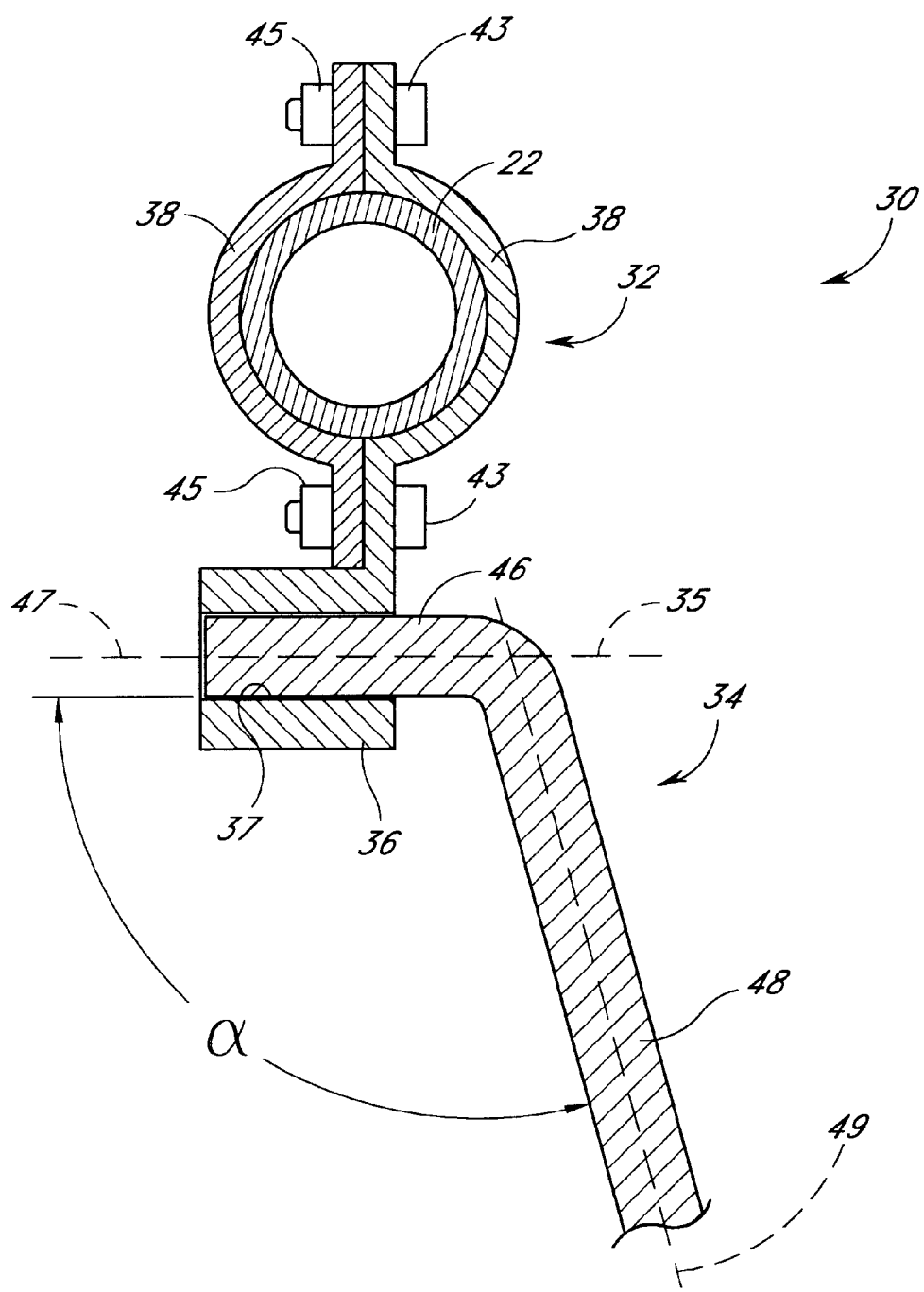
FIG. 4 is a sectional view, taken along line 4—4 of FIG. 2.

FIG. 4 shows the preferred stand 30, with the bracket 32 mounted to the frame element 22 and the support post 34 removably attached to the bracket 32. The bracket 32 is preferably assembled such that the socket block 36 hangs downward from the frame element 22, flush with the plane of the frame 12. The bracket 32 thus has a minimal tendency to rotate about the frame member 22 and does not interfere with the path of the peddles.

While the bracket 32 is shown directly clamped about the frame element 22, it will be understood by the skilled artisan that rubber or other elastomeric pads can be provided to the consumer in varying thicknesses, and wrapped around the frame element 22 between the frame element 22 and the clamping shell 38. Use of such pads can have several advantages. For example, they can allow a single clamping shell design to adapt to various sized frame elements, but permitting the user to select an appropriate thickness to provide the proper fit. Additionally, the clamp 38 may be tightened about the frame element 22 without cracking any paint upon the frame element 22. At the same time, the fit may be tight enough and the elastomeric pad may provide enough friction to prevent rotation of the bracket 32 while the bicycle is in motion or while the bicycle is supported on the stand 30.

Figure 5:
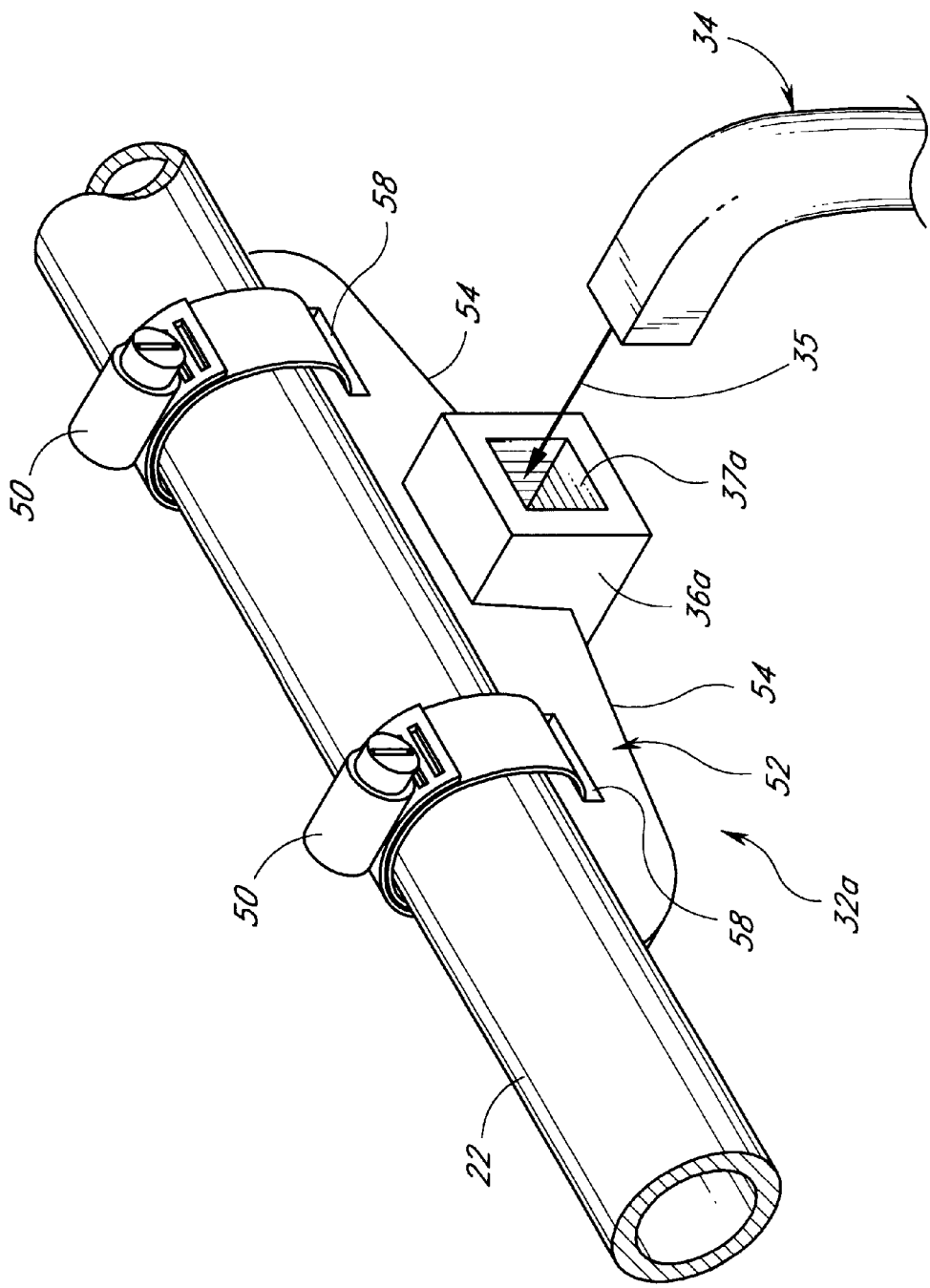
FIG. 5 is a top front perspective view of a stand assembly, constructed in accordance with another embodiment of the present invention.

FIG. 5 illustrates a second embodiment having features in accordance with the illustrated invention. As shown in this embodiment, the socket block 36a is mounted to a bicycle frame element 22a using standard pipe or hose clamps 50. The illustrated mounting bracket 32a comprises two pieces: a mounting flange 52 and a socket block 36a including an aperture 37a which is generally perpendicular to the mounting flange 52. The socket block can also be identically sized and shaped as in the previous embodiment.

The socket block 36a is affixed to the mounting flange 52. As illustrated, the mounting flange 52 has a pair of gussets 54 which extend at least half way up the side wall of the socket block 36a. Opposite the gussets 54, the mounting flange 52 has a contoured edge (not shown) which is preferably contoured to correspond to the radius of the frame element 22a against which the mounting flange 52 is placed. The mounting flange 52 is preferably between about 4 inches and about 6 inches long. In addition, the mounting flange 52 is between about 1/10 inch and about 1/8 inch thick. The illustrated mounting flange 52 is integrally molded with the socket block 36a. Alternatively, the illustrated mounting flange 52 can be machined, stamped, forged, or formed by any other suitable method.

The mounting flange 52 is also provided with slots 58. In the illustrated embodiment, two slots 58 are shown which are substantially parallel to the contoured edge (not shown); nevertheless, the number of slots can vary. The slots 58 are preferably sized and shaped to receive the band of the standard hose clamp 50, as will be understood by one of skill in the art. In other arrangements, the shape and size of the slots will depend upon the fastening mechanism used to affix the mounting flange 52 to the section of the bicycle frame 22a.

The mounting flange 52 is mounted on an element of the bicycle frame 12a, and is illustrated on a swing arm 22a, through the use of standard pipe or hose clamps 50. Other alternative means of mounting the mounting flange 52 can include wire ties, metal banding, rope, tape or other similar materials. As is known to those skilled in the art, the mounting flange 52 can also be attached by welds, brazes, adhesives, epoxies or other similar methods. In addition, the mounting flange 52 can be affixed using a variety of mechanical fasteners such as rivets, bolts, screws, or other similar fasteners.

In use, the shank portion 46 of the support post 34 is preferably friction fit within the aperture 37 of the socket block 36. While the friction fit is preferred to prevent the post 34 from falling out of the socket block 36 inadvertently, the stand 30 will still support a bicycle with a loose fit between the support post 34 and the aperture 37 of the socket block 36. Once in place, the bicycle 10 is tilted laterally in the direction of the applied stand 30 until the leg portion 48 of the support post 34 contacts the ground. As will be recognized by one skilled in the art, the relationship between the aperture 37 size and shape and the shank 46 size and shape help to ensure the stability of the stand 30. When positioned with the lower leg end 48 of the support post 34 in contact with the ground, the weight of the bicycle applies torque to the post 34, clockwise in the view of FIG. 4. This torque is resisted, at one end, by the intersection of the tip of the leg portion 48 with the ground and, at the other end, by the interaction of the shank portion 46 with interior socket block 36 surfaces which define the aperture 37. The bicycle 10 is thus supported with its weight upon the stand 30 while the support post 34 is retained within the aperture 37 of the socket block 36.

Removal of the stand 30 is as simple as its attachment. One merely raises the bicycle 10 from its leaning position so as to elevate the leg portion 48 of the support post 34 from the ground. The shank 46 of the support post 34 is then removed from the aperture 37 of the socket block 36. The support post 34 can then be stored wherever desired, such as on the bicycle 10 itself. The support post 34 is preferably secured to the frame in a manner resistant to forces encountered during the normal and expected use of the bicycle (e.g., off-road mountain biking). The elongated configuration and the light weight of the support post 34 lends itself to ready attachment to one of the frame tubes, such as with spring clips 70 commonly used to mount tire pumps or water bottles to bicycles. Alternatively, the support post can be reversibly mounted to the frame in any of a number of known ways.

The stand of the illustrated invention thus allows a rider, before riding a bicycle, to remove the stand from a first or supporting position on the bicycle and to mount the stand in a second or stored position located on the bicycle. The stand, thus, will not be deployed while riding over rough terrain. The illustrated invention further involves a stand which, when positioned to support the bicycle, will not collapse or disengage in response to forces which are substantially parallel to the expected movement of a bicycle. Advantageously, the stand is inexpensive to manufacture and easy to use. In addition, the stand of the illustrated invention is lightweight and durable.

Although this invention has been described in terms of a certain preferred embodiment, other embodiments apparent to those of ordinary skill in the art are also within the scope of this invention. For example, the preferred embodiments include an aperture in a bracket mounted to the bicycle, such that a support post fits into the aperture. One of skill in the art will recognize that, in other arrangements, the attachment mechanism can be reversed, such that the support post includes an aperture or other female portion and the bracket includes a mating protrusion or male portion. Accordingly, the scope of this invention is intended to be defined only by the claims that follow.

I claim:

1. A stand for supporting a bicycle upon a section of ground, comprising:

a bracket having an aperture formed by a bore extending at least partially through the bracket along a bore axis, an opening of the aperture completely bounded by the bracket material, the bracket including a mounting mechanism configured to mount upon a single frame element of the bicycle; and a support post having a first and second end, said first end sized and shaped to removably extend along the bore axis into and nonrotatably engage with the aperture of said bracket, and said second end adapted to engage the ground.

2. The stand of claim 1, wherein said bore axis extends substantially normal to the frame clement.

3. The stand of claim 2, wherein said bracket includes a mounting block which depends downward from the frame element.

4. A bicycle having rear suspension, the bicycle comprising a frame, two wheels attached to the frame, two peddles pivotally attached to the frame, a mounting block attached to an element of the frame, the mounting block having an aperture formed at least partially therethrough along an aperture axis, the aperture completely bounded by the mounting block in two dimensions orthogonal to the aperture axis, and a support rod adapted to be removably and nonrotatably placed within the aperture by insertion along the aperture axis.

5. The bicycle of claim 4, wherein the support rod comprises a shank portion and a leg portion, the shank and leg portions connected at an elbow defining an angle of between about 90° and about 120°.

6. The bicycle of claim 4, wherein the mounting block is completely supported upon said element of the frame.

7. The bicycle of claim 6, wherein said element of the frame comprises a swing arm pivotally attached to a remainder of the frame.

8. A bicycle comprising a frame and a stand assembly mounted to the frame, the stand assembly including a mounting block fixed to the bicycle frame and a prop rod, the support post having a first portion extending along a first axis and a second portion extending along a second axis, the first axis defining an angle of between about 90° and about 120° with the second axis, the mounting block having a receiving aperture extending into the mounting block along a receiving axis such that an opening of the aperture is surrounded by mounting block material, the first portion of the of the prop rod adapted to reversibly and nonrotatably mate with the receiving aperture with the first axis of the prop rod parallel to the receiving axis.

9. The bicycle of claim 8, wherein the receiving axis is substantially transverse to the bicycle frame.

10. The bicycle of claim 9, wherein the receiving aperture has a substantially square cross-section.

11. The bicycle of claim 8, wherein the first portion defines an angle of about 105° with the second portion.

12. A stand for supporting a two-wheeled vehicle in a standing position, comprising:

a bracket adapted to be attached to a frame of the vehicle, the bracket including; an aperture; and a support post having a first end and a second end, the first end proportioned to be removably nonrotatably and frictionally held within the aperture such that the first end is surrounded by the bracket when the vehicle is supported upon the stand, the second end adapted to contact the ground when the vehicle is supported upon the stand.

13. The bicycle stand of claim 12, wherein the bracket is completely supported upon a single element of the frame of the vehicle.

* * * * *

UNITED STATES PATENT AND TRADEMARK OFFICE
CERTIFICATE OF CORRECTION

PATENT NO.    : 6,168,180 B1
DATED         : January 2, 2001
INVENTOR(S)   : Gary Egloff It is certified that error appears in the above-identified patent and that said Letters Patent is hereby corrected as shown below:

<u>Column 8,</u>
Line 16, "and a prop rod" should be -- and a support post --
Line 24, "of the prop rod" should be -- of the support post --
Line 26, "prop rod" should be -- support post --

Signed and Sealed this

First Day of October, 2002

*Attest:*

JAMES E. ROGAN
*Attesting Officer*   *Director of the United States Patent and Trademark Office*